Figure 1:
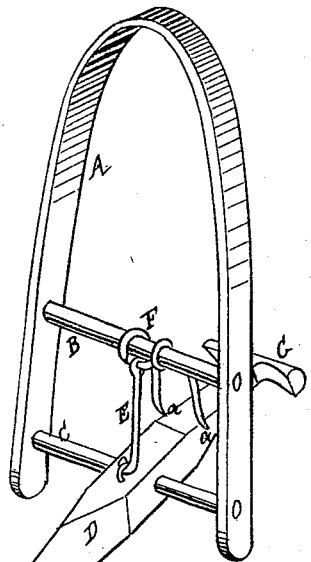
Figure 2:
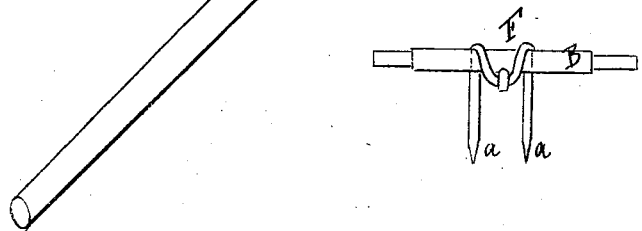

72265 George W. Carpender
Animal Poke

PATENTED
DEC 17 1867

Witnesses
A. A. Yeatman
Cornelius Roe

Inventor
George W. Carpender
per
Alexander & Mason
atty

United States Patent Office.

GEORGE W. CARPENDER, OF JARVIS, INDIANA.

Letters Patent No. 72,265, dated December 17, 1867.

IMPROVEMENT IN ANIMAL-POKES.

*The Schedule referred to in these Letters Patent and making part of the same.*

TO ALL WHOM IT MAY CONCERN:

Be it known that I, GEORGE W. CARPENDER, of Jarvis, in the county of DeKalb, and in the State of Indiana, have invented certain new and useful Improvements in Animal-Poke; and do hereby declare that the following is a full, clear, and exact description thereof, reference being had to the accompanying drawings, and to the letters of reference marked thereon.

In the annexed drawings, making part of this specification, A represents a wooden bow, which surrounds the neck of the animal. B and C represent two rounds, which pass through the bow beneath the throat of the animal. The round C passes through a bar, D, and thus confines it to the bow. The lower end of this bar hangs under the neck, projecting in front of the animal, while the upper end extends up close to its throat. F represents a wire collar which surrounds the round B, and which has two sharp ends or points, $a\,a$. The upper end of bar D lies between the points or ends $a\,a$. The collar F is connected to bar D by means of a rod, E.

When this poke is placed upon the neck of an animal the points $a\,a$ project towards his throat, and when it approaches a fence, the lower end of the bar D, striking against the fence, causes the points $a\,a$ to project beyond the sides of the upper end of the bar and prick the animal in the throat, which of course makes it recede from the fence.

Having thus fully described my invention, what I claim as new, and desire to secure by Letters Patent, is—

The bow A, rounds B and C, bar D, rod E, and collar F, with its points, the several parts being constructed and used as and for the purpose set forth.

In testimony that I claim the foregoing, I have hereunto set my hand, this 5th day of September, 1867.

GEORGE W. CARPENDER.

Witnesses:
 JOHN HELING,
 JAMES E. ROSE.